United States Patent
Ball et al.

[11] Patent Number: 5,431,448
[45] Date of Patent: Jul. 11, 1995

[54] THREE-POINT SAFETY BELT SYSTEM FOR MOTOR VEHICLES

[75] Inventors: Wilfried Ball, Dingolfing; Josef Haberl, Aschheim; Hans-Joachim Kraft, Kirchstockach; Wolfgang Kleemann, Starnberg, all of Germany

[73] Assignee: Bayerische Motoren Werke AG, Munich, Germany

[21] Appl. No.: 70,757

[22] Filed: Jun. 3, 1993

[30] Foreign Application Priority Data

Jun. 6, 1992 [DE] Germany .......... 42 18 792.3

[51] Int. Cl.6 ............................. B60R 22/00
[52] U.S. Cl. ................... 280/808; 280/801.1; 280/801.2; 297/473; 297/479
[58] Field of Search ......... 280/801.1, 801.2, 806, 280/808, 756; 297/473, 480, 477, 478

[56] References Cited

U.S. PATENT DOCUMENTS

| | | | |
|---|---|---|---|
| 4,213,638 | 7/1980 | Sacco et al. | 280/801.2 |
| 4,469,351 | 9/1984 | Matsuoka . | |
| 4,557,502 | 12/1985 | Scaduto et al. | 280/756 |
| 4,592,571 | 6/1986 | Baumann et al. | 280/806 |
| 4,840,398 | 6/1989 | Matthias et al. | 280/756 |
| 5,149,134 | 9/1992 | Fohl | 280/806 |
| 5,152,552 | 10/1992 | Ikegaya | 280/806 |

FOREIGN PATENT DOCUMENTS

| | | | |
|---|---|---|---|
| 0420664A1 | 4/1991 | European Pat. Off. . | |
| 2400914 | 3/1979 | France . | |
| 2249786 | 7/1974 | Germany | 297/480 |
| 2336531 | 2/1975 | Germany | 280/806 |
| 2738140 | 3/1979 | Germany . | |
| 2738939 | 3/1979 | Germany . | |
| 2727125 | 10/1981 | Germany . | |
| 4218792 | 12/1993 | Germany | 280/808 |

OTHER PUBLICATIONS

L'Automobile, Jul. 1991, p. 35.

*Primary Examiner*—Eric D. Culbreth
*Attorney, Agent, or Firm*—Evenson, McKeown, Edwards & Lenahan

[57] ABSTRACT

A three-point safety belt system is provided which the upper deflection and fastening point for the belt strap cannot be arranged on the B-column of a vehicle body. So as not to interfere with the appearance of the vehicle body or with its lines but, yet obtain an optimal course of the belt strap in the event of a crash, the safety belt system has a displaceable belt point. This belt point is normally kept downward and will then be situated in the area of the window ledge or lower and can thus not be seen from the outside. In the event of a crash, the belt point displaces upward and thereby provides a belt strap course which ensures an optimal protection of the vehicle occupants.

6 Claims, 4 Drawing Sheets

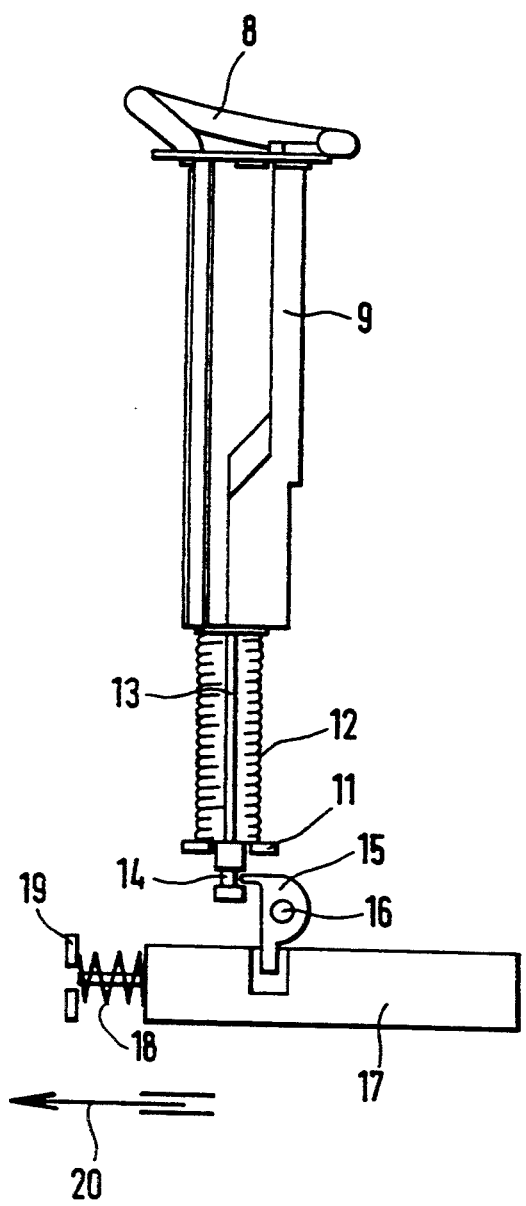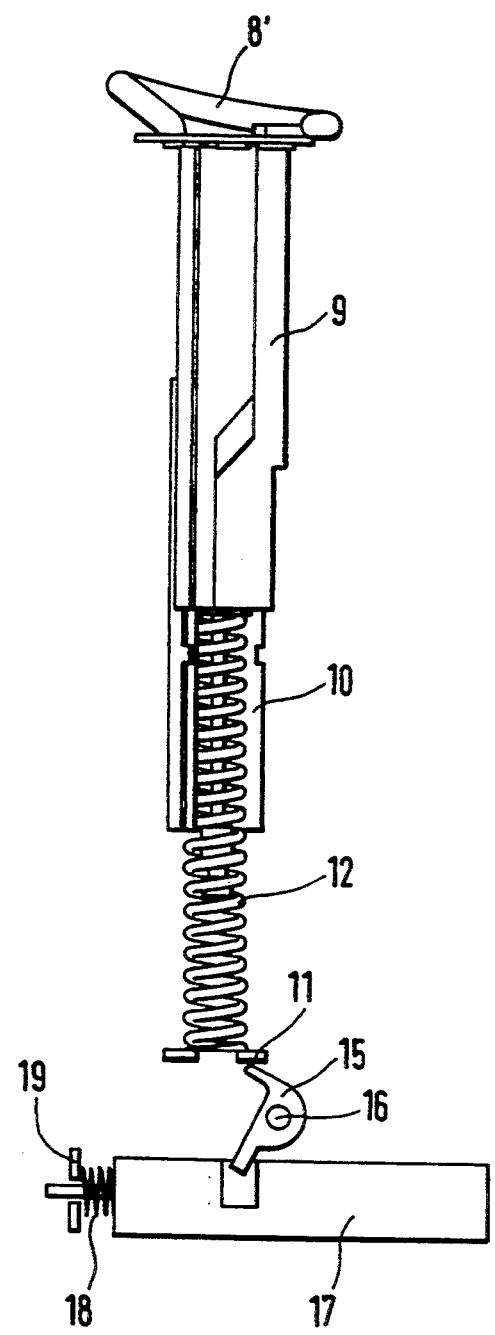

THREE-POINT SAFETY BELT SYSTEM FOR MOTOR VEHICLES

BACKGROUND AND SUMMARY OF THE INVENTION

The present invention relates to a three-point safety belt system for motor vehicles with a belt point serving as the belt strap deflection or belt strap fastening at a side wall of a vehicle body and near an upper edge of a backrest of a vehicle seat assigned to the safety belt.

Conventional three-point safety belt systems have a deflecting and fastening point for the belt strap on the B-column of the vehicle body. To provide an optimal course of the belt strap, this belt point as a rule is higher than the window ledge of the vehicle body. By contrast, in vehicles without such a B-column (these are particularly vehicles with an open vehicle body, i.e., convertibles) the belt point may at most be arranged at the level of the window ledge.

For such a case, the German Patent Document DE-PS 27 27 125 provides a hump which is placed or formed onto the window ledge. The belt strap emerges at the highest point of the hump. Although, as a result of this measure, the course of the belt strap can be optimized, the visual appearance of the vehicle is impaired.

An object of the invention is to provide a mounting site for a belt point for a motor vehicle in which the mentioned belt point cannot be arranged on a B-column, which ensures optimal protection by means of the safety belt in event of a crash, but does not impair the appearance of the vehicle.

This and other objects are achieved by the present invention which provides a three-point safety belt system for motor vehicles with a belt point serving as at least one of a belt strap deflection and a belt strap fastening at a side wall of a vehicle body of the motor vehicle near an upper edge of a backrest of a vehicle seat assigned to the safety belt, wherein the belt system is configured such that the belt point is displaced upward when a given vehicle deceleration is exceeded.

According to the invention, the belt strap point can be displaced upward as soon as the vehicle is decelerated beyond a given value. As a result, it is achieved that in the normal case, the belt strap point is at most at the level of the window ledge and, because it is situated in the interior, is covered by the window ledge and thus is not visible from the outside. It therefore does not interfere with the lines and thus the appearance of the vehicle body.

By contrast, in the event of a crash, the belt point is displaced upward and provides a course of the belt strap which is optimal for the safety of the person wearing the safety belt.

The displacement of the belt point may be carried out in different manners. Thus, hydraulic and pneumatic control elements are suitable as well as electric control elements. When appropriate, pyrotechnical elements may also be used.

The unlocking for the displacement of the belt point may expediently be initiated by means of an existing air bag sensor. This is particularly advantageous when the displacement of the belt point takes place electromechanically or pyrotechnically.

In a particularly simple and expedient embodiment, a spring is used for the displacement of the belt strap.

Three-point safety belt systems are as a rule constructed so that the belt strap extends from a belt re- winder fastened in the lower area of the vehicle body side wall upwards to a deflection lug. There, it is deflected and extends transversely over the shoulder of the vehicle occupant to a lock tongue which is inserted into a belt buckle fastened in the area of the cardan tunnel or at the seat or the seat rail. From the lock tongue, the belt strap extends via the pelvis of the vehicle occupant back to the exterior side and is fastened there in the proximity of the vehicle body floor or on the seat or the seat rail.

In an advantageous embodiment, with such a course of the belt strap, the belt point is a deflection lug which deflects the belt strap in the direction of the upper part of the body of the vehicle occupant. In this case, the deflection lug is connected with a sliding block which is perpendicularly movable in a guide fixed to the vehicle body. By means of these devices, the displaceability of the deflection point is ensured in a simple manner.

If the displacement is to take place by means of spring force, a compression spring is provided between the sliding block and a support fixed to the vehicle body. The compression spring will be compressed and thus prestressed as soon as the belt point moves into its lower and therefore into its normal position or is situated there. A locking mechanism, which in an expedient manner responds to the vehicle deceleration, holds the spring in the prestressed condition.

Other objects, advantages and novel features of the present invention will become apparent from the following detailed description of the invention when considered in conjunction with the accompanying drawings.

BRIEF DESCRIPTION OF THE DRAWINGS

FIGS. 2 and 3 are enlarged views of a belt point displacement mechanism in accordance with the present invention in the prestressed and released positions, the mechanism being provided in the area of the circular cutout A according to FIG. 1.

DETAILED DESCRIPTION OF THE DRAWINGS

Figure 1:
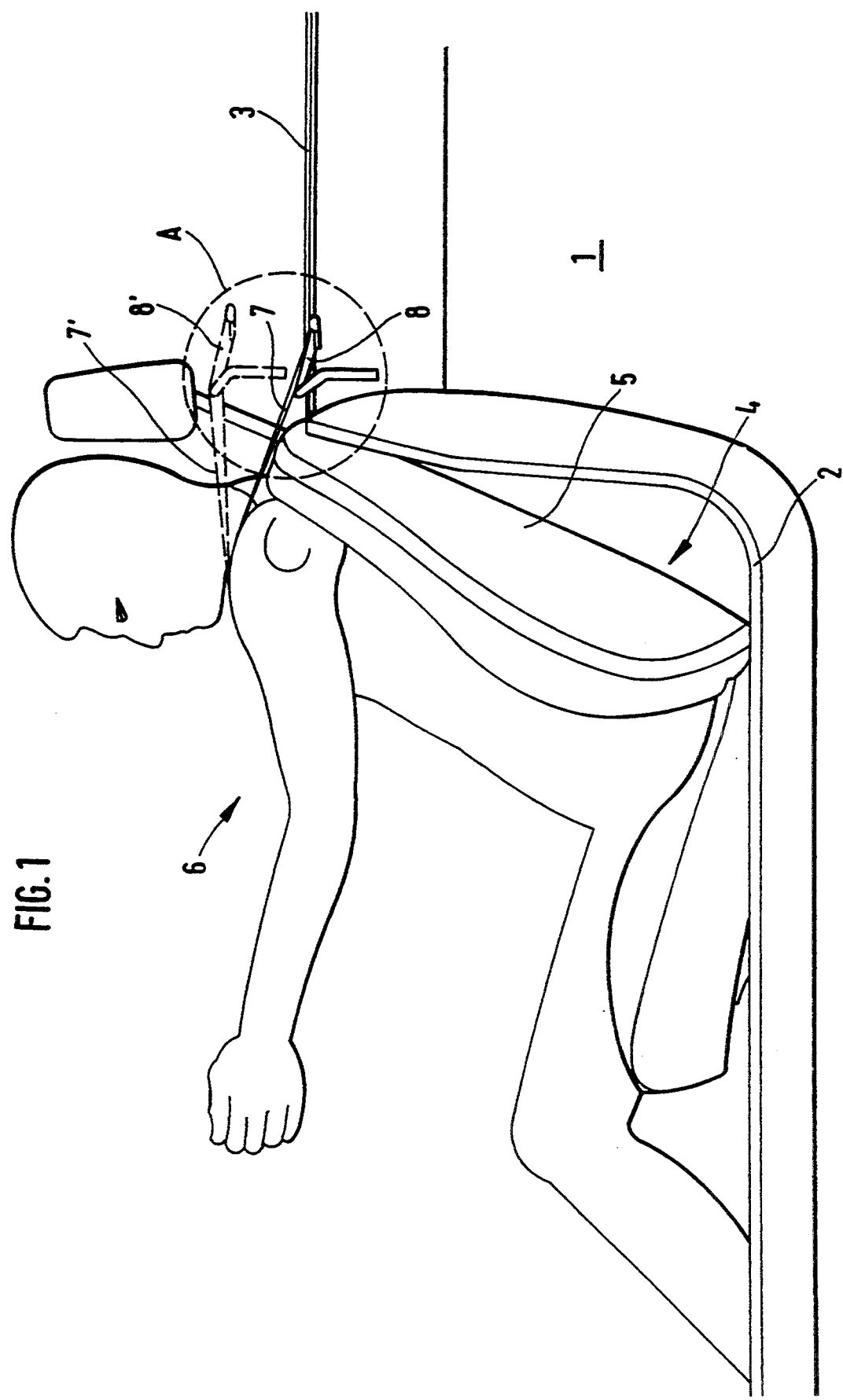
FIG. 1 is a schematic representation of portion of a vehicle body with an open vehicle body and a vehicle seat on which a person is sitting.

The section 1 of the vehicle body illustrated in FIG. 1 has a door cutout 2 and a window ledge 3. In the area of the door cutout 2, a seat 4 with a backrest 5 is provided in the vehicle interior. A person 6 is shown sitting on the vehicle seat 4.

This person 6 is held by a three-point safety belt system of which only one belt section 7 is illustrated in FIG. 1. In this case, the belt section 7 is part of a conventional three-point safety belt system described above. The belt strap 7 emerges from a deflection lug 8 or belt point and is deflected in the direction of the upper body of the vehicle occupant. For this purpose, the deflection lug 8 or belt point is arranged in the area of the side wall of the vehicle body 1 in the neighborhood of the upper edge of the backrest 5. In this embodiment, the lug 8 is disposed at the level of the window ledge 3 and thus does not interfere with the lines of the vehicle body and with the appearance of the vehicle.

According to the invention, the deflection lug 8 and thus the belt strap 7 are displaced upward as soon as the vehicle experiences an excessive deceleration. This position is illustrated by interrupted lines in FIG. 1. The deflection lug 8' can be recognized which is now situated farther on top and which also deflects the belt strap 7' back in the direction of the upper body of the vehicle occupant; however, now at a different angle. The belt strap section slightly slopes downward toward the upper body. Thus the belt strap course is achieved which provides the vehicle occupant with optimal protection.

The displacement mechanism is illustrated in FIGS. 2 and 3. FIG. 2 shows the deflection lug 8 in its lower normal position, and FIG. 3 shows it in its extended position. The deflection lug 8 which, as a rule, comprises a metal ring, is fixedly connected with a sliding block 9. The sliding block 9 can be moved upward and downward along a guide 10, which in a manner not shown in detail is connected with the vehicle body 1. A compression spring 12 is disposed between the sliding block 9 and a support fixed to the vehicle body. According to FIG. 2, when the deflection lug 8 is displaced downward, the compression spring 12 is compressed and thereby prestressed.

The sliding block 9 carries a pin 13 which penetrates downward through the compression spring 12 and which has a head-type thickening with a ring groove 14 in its lower projecting end. A nose of a detent pawl 15 engages into the ring groove 14. The detent pawl 15 can be rotated about a swivel shaft 16 fixed to the vehicle body. For this purpose an inertia mass 17 is provided which moves in the longitudinal direction of the vehicle and in a guide fixed to the vehicle body which is not shown in detail and which extends in the longitudinal direction of the vehicle. The longitudinal direction of the vehicle and the driving direction is shown in FIG. 2 by the arrow 20. An arm of the locking pawl 15 engages in a recess of the inertia mass 17. The inertia mass 17 is held in its position illustrated in FIG. 2 via a compression spring 18 which is supported on a point 19 fixed to the vehicle body.

If a vehicle deceleration occurs now which exceeds a given value, the mass 17 is moved forward in the direction of the arrow 20 due to its inherent inertia. The mass 17 presses on the arm of the locking pawl and rotates it clockwise via the swivel pin 16. The pin 13 is released, the compression spring 12 is relaxed and momentarily displaces the deflection lug 8 upward into the position illustrated by an interrupted line in FIG. 1.

Figure 4:
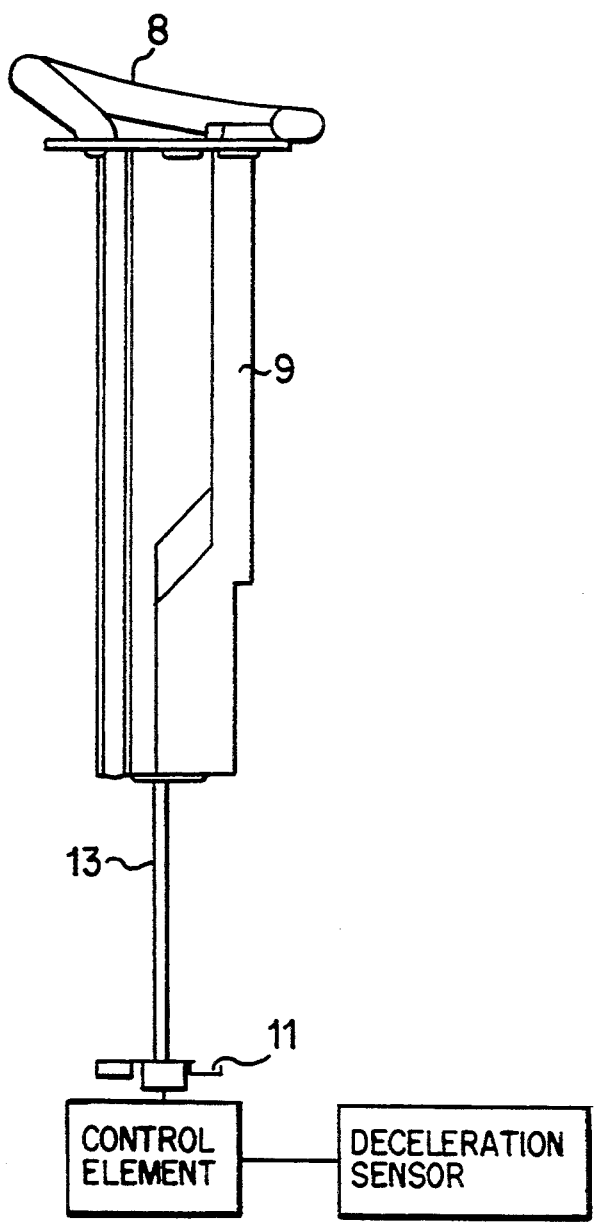
FIG. 4 shows a belt point with alternate embodiments of the control elements for displacement.
Figure 5:
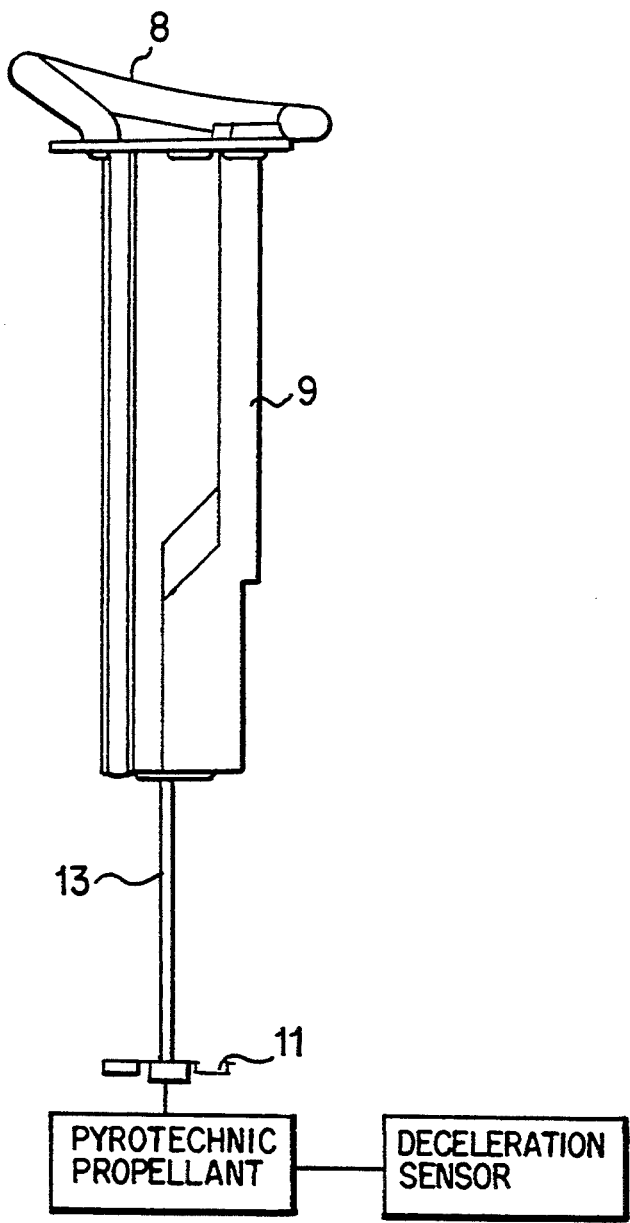
FIG. 5 shows a belt point with a pyrotechnical propellant for displacement of the belt point.

FIG. 4 shows an alternate embodiment of the belt point according to the present invention, in which the spring is replaced by control elements responsive to a deceleration sensor. These control elements can be electrical, hydraulic or pneumatic and operate to displace the belt point upward in the event of a deceleration beyond a given threshold. FIG. 5 shows an embodiment of the belt point in which a pyrotechnical propellant is used to displace the belt point when necessary. The electric, pneumatic, hydraulic and pyrotechnic systems are conventionally known systems as is readily understood by one of ordinary skill in the art.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A three-point safety belt system for a motor vehicle with a belt point for a safety belt, said belt point serving as at least one of a belt strap deflection point and a belt strap fastening located at a side wall of a vehicle body near an upper edge of a backrest of a vehicle seat assigned to the safety belt, wherein the belt system is configured such that the belt point is displaced upward when a given vehicle deceleration is exceeded, further comprising a spring force operable on the belt point to displace the belt point, wherein the belt point includes a deflection lug through which the belt strap travels, a sliding block fixedly connected with the deflection lug, and a guide rail fixed to the vehicle body, the sliding block being substantially vertically movable in the guide rail with respect to the motor vehicle, further comprising a compression spring between the sliding block and a support fixed to the vehicle body, said compression spring being prestressed when said belt point is displaced downward; and a locking mechanism, responsive to vehicle deceleration, coupled to hold the compression spring in the prestressed condition.

2. A safety belt system according to claim 1, comprising electric control elements coupled to the belt point which are operable to displace the belt point.

3. A safety belt system according to claim 1, further comprising at least one of hydraulic and pneumatic control elements coupled to the belt point which are operable to displace the belt point.

4. A safety belt system according to claim 1, further comprising a pyrotechnical propellant coupled to the belt point and which is operable to displace the belt point.

5. A safety belt system according to claim 1, wherein the locking mechanism includes a pin, which is fixedly connected with the sliding block, projects downward and has a surrounding grove into which a detent pawl engages when the belt point is displaced downward, said detent pawl being swivelable in response to movement of an inertia mass.

6. A safety belt system according to claim 5, wherein the inertia mass is displaceable against a spring force essentially in the longitudinal direction of the vehicle.

* * * * *